(12) United States Patent
Banerjee

(10) Patent No.: US 6,820,127 B2
(45) Date of Patent: Nov. 16, 2004

(54) METHOD, SYSTEM, AND PRODUCT FOR IMPROVING PERFORMANCE OF NETWORK CONNECTIONS

(75) Inventor: Dwip N. Banerjee, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 458 days.

(21) Appl. No.: 09/848,168

(22) Filed: May 3, 2001

(65) Prior Publication Data

US 2002/0165992 A1 Nov. 7, 2002

(51) Int. Cl.[7] ............................. G06F 15/16; G06F 9/46
(52) U.S. Cl. ..................... 709/230; 718/103; 709/232; 709/229; 709/223
(58) Field of Search ................................ 709/227–229, 709/230–240, 207; 718/103, 100

(56) References Cited

U.S. PATENT DOCUMENTS

| | | | |
|---|---|---|---|
| 5,339,413 A | * | 8/1994 | Koval et al. ................. 719/314 |
| 5,537,417 A | * | 7/1996 | Sharma et al. ............... 709/228 |
| 6,138,211 A | * | 10/2000 | Ahn et al. .................... 711/136 |
| 6,625,149 B1 | * | 9/2003 | Brustoloni et al. .......... 370/389 |
| 6,683,886 B1 | * | 1/2004 | van der Tuijn et al. ...... 370/458 |

OTHER PUBLICATIONS

Hossain, Zahid. "High Performance Transports: HTPNET, TCP/IP, XTP, TP++, and RTP". Aug. 24, 1995.*
Mckenney, Paul E. et al. "Efficient Demultiplexing of Incoming TCP Packets." Sequent Computer Systems, Inc. ACM. 1992.*
Partridge, Craig et al. "A Faster UDP". IEEE. Aug. 1993.*

* cited by examiner

*Primary Examiner*—Lewis A. Bullock, Jr.
(74) *Attorney, Agent, or Firm*—Duke W. Yee; Volel Emile; Stephen J. Walder, Jr.

(57) ABSTRACT

A method, system, and product are described for improving the performance of a TCP connection. A cache is established for storing protocol control blocks (PCBs). The protocol control blocks are associated with sockets which were created in response to TCP connections. PCBs are stored in the cache. PCBs may be prioritized. High priority PCBs are stored in the PCB cache while the low priority PCBs are stored in a linked list in a hash table.

21 Claims, 5 Drawing Sheets

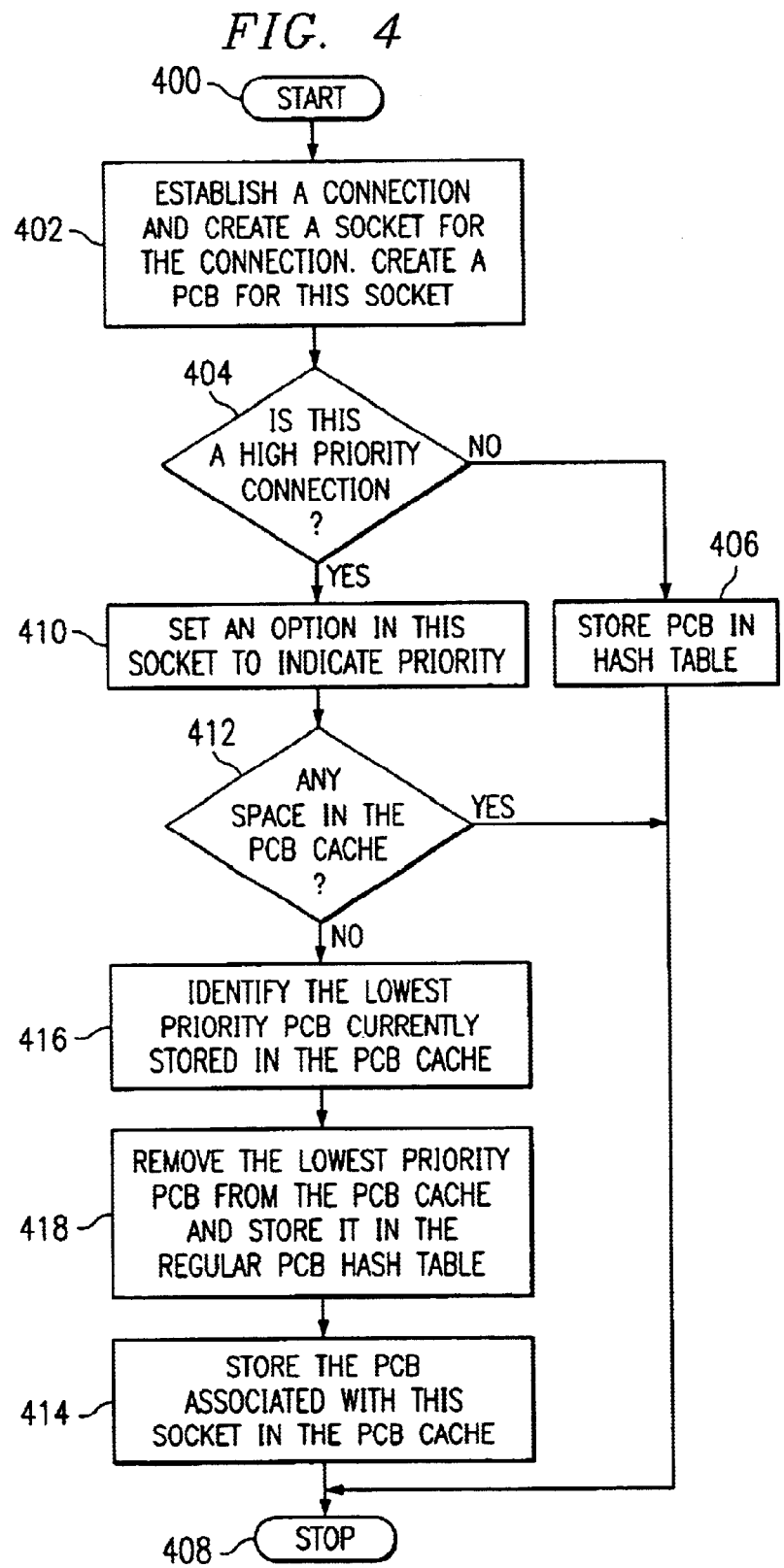

METHOD, SYSTEM, AND PRODUCT FOR IMPROVING PERFORMANCE OF NETWORK CONNECTIONS

BACKGROUND OF THE INVENTION

1. Technical Field

The present invention relates generally to the field of computer systems and more specifically to computer network management. Still more particularly, the present invention relates to a method, system, and product for improving the performance of a TCP connection.

2. Description of Related Art

Networked computer systems utilize communications protocols in order to communicate with each other. In order to communicate utilizing the Internet, computer systems must adhere to the Transmission Control Protocol (TCP) and the Internet Protocol (IP). The Transmission Control Protocol defines the structure and method used for assembling packets for transmission, and for disassembling received packets.

When two computer systems need to communicate with one another across a network, a software connection is established between a TCP application executing on one computer system and a TCP application executing on the other computer system. When a software connection is established, a socket is created which is associated with this particular connection. The socket is a software construct which is used to identify the particular connection. Packets are transmitted from one application to another utilizing the software connection. When a packet is received, the receiving computer system must determine which software connection was utilized. The sockets are used in order to make this determination.

Multiple applications are typically executing on each computer system. A separate software connection is established when one application needs to communicate with another. Therefore, multiple software connections may be established for one computer system. When this computer system receives a packet, it must determine to which application to forward the packet. The sockets are used to make this determination.

For each socket, a protocol control block (PCB) is established. Information about the associated connection is stored in the PCB for the socket. When a packet is received on the physical interface of a computer system, the computer system first extracts source and destination addresses and local and destination port numbers to use to locate a particular PCB. Once the particular PCB is located, the PCB is used to locate the socket which is associated with the PCB. This socket is then used to determine which user process is supposed to receive this packet. This process is described in more detail below.

FIG. 6 is a block diagram of a protocol control block (PCB) 600 and a socket 602 associated with PCB 600 in accordance with the prior art. Each PCB 600 includes a pointer 604 to a next PCB in a linked list which is included in a hash table. All of the PCBs stored in a computer system are stored linked in this manner. The PCB also includes a local TCP address 606 which is the TCP address of the computer system within which this PCB is stored. Each PCB includes a destination TCP address 608. A software connection has been established between an application executing on this local computer system and an application executing on a destination computer system. Destination TCP address 608 is the TCP address of the destination computer system. PCB 600 also includes a local port number 610 and a destination port number 612. The local port number 610 is a software variable which identifies a particular process executing on the local computer system. The destination port number 612 is a software variable which identifies a particular process executing on the destination computer system. PCB 600 includes other data 614 and a pointer 616 to the socket 602 which is associated with this PCB 600.

Socket 602 includes a send buffer 618, a receive buffer 620, and a file descriptor which identifies the process executing on the local computer system which owns this socket 602. Other data 624 is also stored in socket 602. Socket 602 includes a pointer to PCB 600 which is associated with this socket 602.

When a packet is received, the source and destination addresses, and source and destination port numbers are used to locate a particular PCB. This PCB will point to a particular socket. The PCB and socket are both associated with the software connection through which this packet was transmitted. Once the socket is located, it may be used to correctly identify the application which is to receive this packet. This process is described in more detail below.

FIG. 7 is a high level flow chart which depicts receiving a packet and forwarding the packet to its intended user process in accordance with the prior art. The process starts as depicted by block 700 and thereafter passes to block 702 which illustrates a packet being received on a computer system's physical interface. Next, block 704 depicts the computer system generating an interrupt, processing the packet, and passing the packet to the IP layer of the computer system.

Each packet includes a header. The header includes an IP header and a TCP header. The IP header includes an IP address of the source computer and an IP address of the destination computer, as well as other IP layer and protocol information. The TCP header includes a TCP address of the source computer and a TCP address of the destination computer, as well as other TCP layer and protocol information. Block 706 illustrates getting the source and destination IP addresses from the IP header of the packet.

Block 708 depicts determining from the IP header the protocol used to transmit the packet and passing the packet to the TCP layer. Next, block 710 illustrates the TCP layer then retrieving the local and destination port numbers from the TCP layer. The process then passes to block 712 which illustrates using the local address, the local port number, the destination address, and the destination port number along with the protocol type to locate a particular PCB within the PCB hash table. The pointer stored in this particular PCB is then utilized, as depicted by block 714, to locate the socket which is associated with this particular PCB. Next, block 716 illustrates using the socket to determine which user process should receive this packet. This is the socket which was opened for this particular user process. Block 718 depicts delivering the packet to the particular user process. The process then terminates as illustrated by block 720.

The process described above must be repeated for each packet when the packet is received. Therefore, many PCBs are typically stored in a computer system. When the computer system receives a packet, it must search through these PCBs in order to locate a particular PCB. In the prior art, these PCBs are stored in a single linked list in a hash table having separate chaining such that each hash table entry represents a chain of a limited number of unique PCBs. Each element of the hash table points to a list of PCBs. The PCB hash table can become extremely large. As the hash table becomes larger, the time required to locate a particular PCB also increases. This, then, slows communication processing because a PCB must be located in the large hash table each time a packet is received.

Therefore, a need exists for a system, method, and product for improving computer network connection processing by prioritizing PCBs and storing frequently used or other high priority PCBs in a PCB cache whereby the high priority PCBs may be located quickly.

SUMMARY OF THE INVENTION

The present invention is a method, system, and product for improving the performance of a network connection by improving communication processing. Each software connection has an associated socket and protocol control block (PCB). The PCBs are prioritized. High priority PCBs are stored in a PCB cache so that the high priority PCBs may be retrieved quickly. Low priority PCBs are stored in a linked list.

Most high performance machines have deep memory hierarchies. These memory hierarchies may be exploited by adding a small PCB cache in order to generate good performance. Thus, a PCB cache is established in which high priority PCBs may be stored. Retrieving PCBs from the PCB cache is much faster than retrieving PCBs from a linked list or hash table.

The size of the fast PCB cache may be set as a network option. Ideally the PCB cache is small and contains the most frequently accessed PCBs. The PCB cache does not include any chaining, i.e. it does not include a linked list.

A priority may be assigned to each socket, and thus to the PCB associated with the socket. For example, each socket may include a special socket option, SO_PCBCACHE, wherein the socket's priority may be stored. The PCBs associated with high priority sockets are stored in the PCB cache, while the PCBs associated with low priority sockets are stored in a linked list or hash table. In this manner, for high priority sockets, the retrieval time is reduced for the PCBs associated with these high priority sockets because the PCB cache is searched first and the PCB cache is the fastest level of memory.

For example, WEB requests may be assigned a higher priority than other connections. Therefore, the listening socket for port 80, the WEB server port number, is assigned a high priority in order to deliver high performance. Thus, the PCB associated with this connection will be stored in the PCB cache.

According to the present invention, when a packet is received, its associated connection and socket are determined. The PCB cache is first searched to try to locate the PCB associated with this socket. If the PCB is not found in the PCB cache, the hash table or linked list is then searched. If the packet is transmitted through a connection having an associated socket which is designated as having a high priority, the PCB will be stored in the PCB cache, thus, providing a faster response. For all lower priority sockets, the associated PCBs will be stored and found in the hash table.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 4 is a high level flow chart which depicts a storage of protocol control blocks (PCBs) in a PCB cache in accordance with the present invention;

DETAILED DESCRIPTION OF THE PREFERRED EMBODIMENT

A preferred embodiment of the present invention and its advantages are better understood by referring to the figures, like numerals being used for like and corresponding parts of the accompanying figures.

The invention is preferably realized using a well-known computing platform, such as an IBM RS/6000 server running the IBM AIX operating system. However, it may be realized in other popular computer system platforms, such as an IBM personal computer running the Microsoft Windows operating system or a Sun Microsystems workstation running operating systems such as UNIX or LINUX, without departing from the spirit and scope of the invention.

Figure 1:
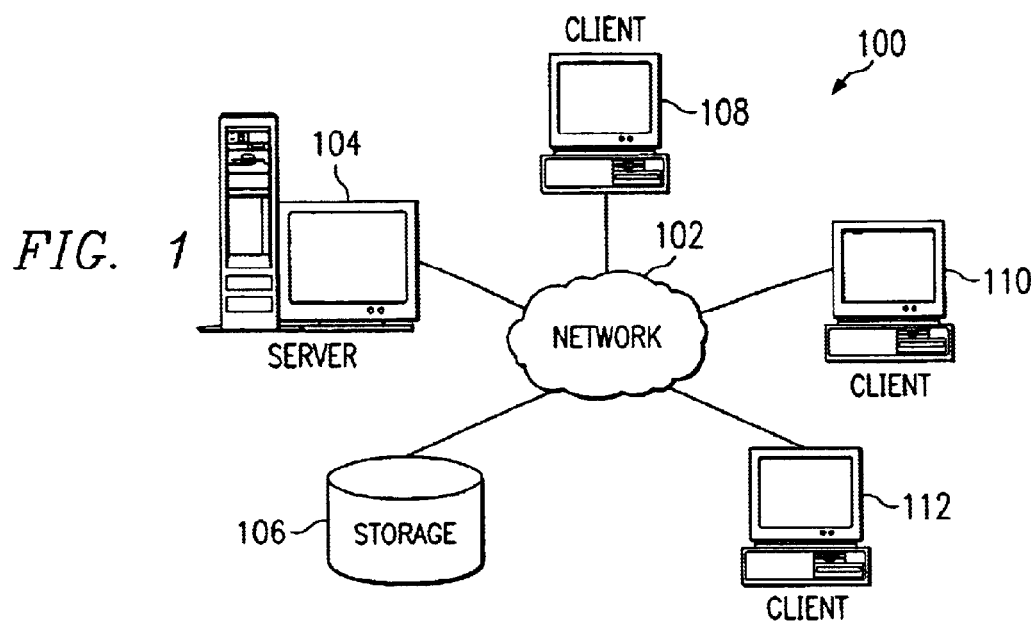
FIG. 1 depicts a block diagram of a data processing system in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, a server 104 is connected to network 102 along with storage unit 106. In addition, clients 108, 110, and 112 also are connected to network 102. These clients 108, 110, and 112 may be, for example, personal computers or network computers. In the depicted example, server 104 provides data, such as boot files, operating system images, and applications to clients 108–112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
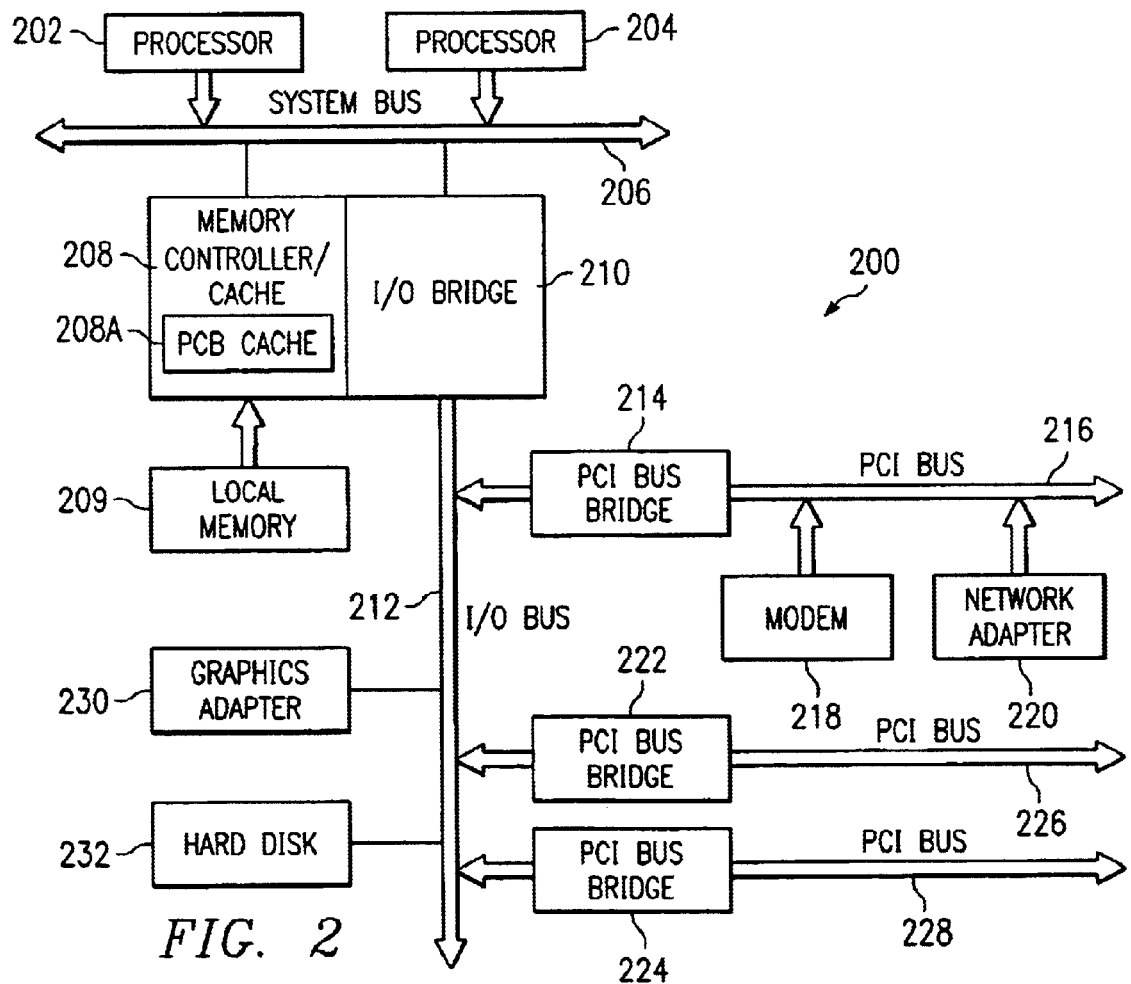
FIG. 2 illustrates a block diagram of a computer system which may be utilized as a server computer system in accordance with the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Memory controller/cache 208 includes a protocol control block (PCB) cache 208A. PCB cache 208A is used to stored PCBs. Typically, PCBs will be prioritized. The highest priority PCBs will then be stored in PCB cache 208A. A network option may be used to set the size of PCB cache 208A. Alternatively, the PCB cache may be stored within each processor. The PCB cache is small and contains the most frequently accessed PCBs.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM RISC/System 6000 system, a product of International Business Machines Corporation in Armonk, N.Y., running the Advanced Interactive Executive (AIX) operating system.

Figure 3:
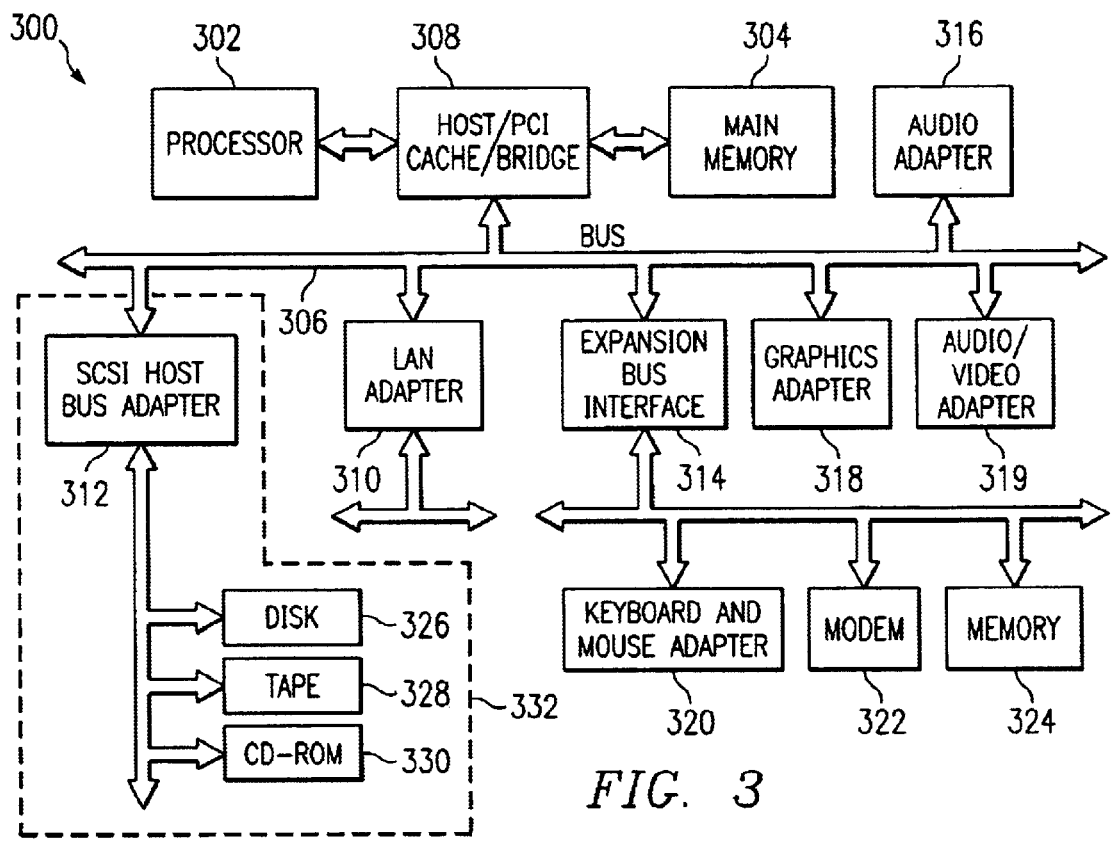
FIG. 3 depicts a block diagram of a computer system which may be utilized as a client computer system in accordance with the present invention.
Figure 6:
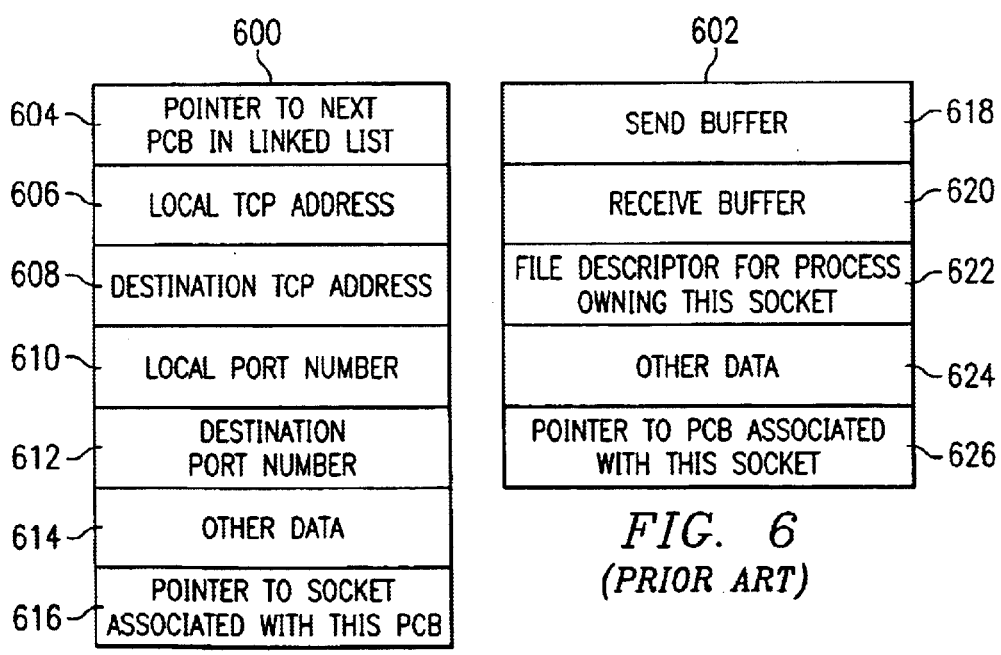
FIG. 6 is a block diagram of a protocol control block (PCB) and a socket associated with the PCB in accordance with the prior art.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows 2000, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

FIG. 4 is a high level flow chart which depicts a storage of protocol control blocks (PCBs) in a PCB cache in accordance with the present invention. The process starts as depicted by block 400 and thereafter passes to block 402 which illustrates establishing a connection and creating a socket for the connection. A protocol control block (PCB) is also created which is associated with this socket. Next, block 404 depicts a determination of whether or not this is a high priority connection. If a determination is made that this is not a high priority connection, the process passes to block 406 which illustrates storing the PCB associated with this socket in a hash table. Thereafter, the process terminates as depicted by block 408.

Referring again to block 404, if a determination is made that this is a high priority connection, the process passes to block 410 which illustrates setting an option in this socket to indicate its high priority. One of a range of priorities may be specified. Next, block 412 depicts a determination of whether or not there is any empty space in PCB cache 208A. If a determination is made that there is empty space in PCB cache 208A, the process passes to block 414 which depicts a storage of the PCB associated with this socket in PCB cache 208A. The process then terminates as illustrated by block 408.

Referring again to block 412, if a determination is made that there is no empty space in PCB cache 208A, the process passes to block 416 which depicts an identification of the lowest priority PCB currently stored in PCB cache 208A. Next, block 418 illustrates a removal of the lowest priority PCB from PCB cache 208A, and the storage of this lowest priority PCB in the hash table. The process then passes to block 414.

Figure 5:
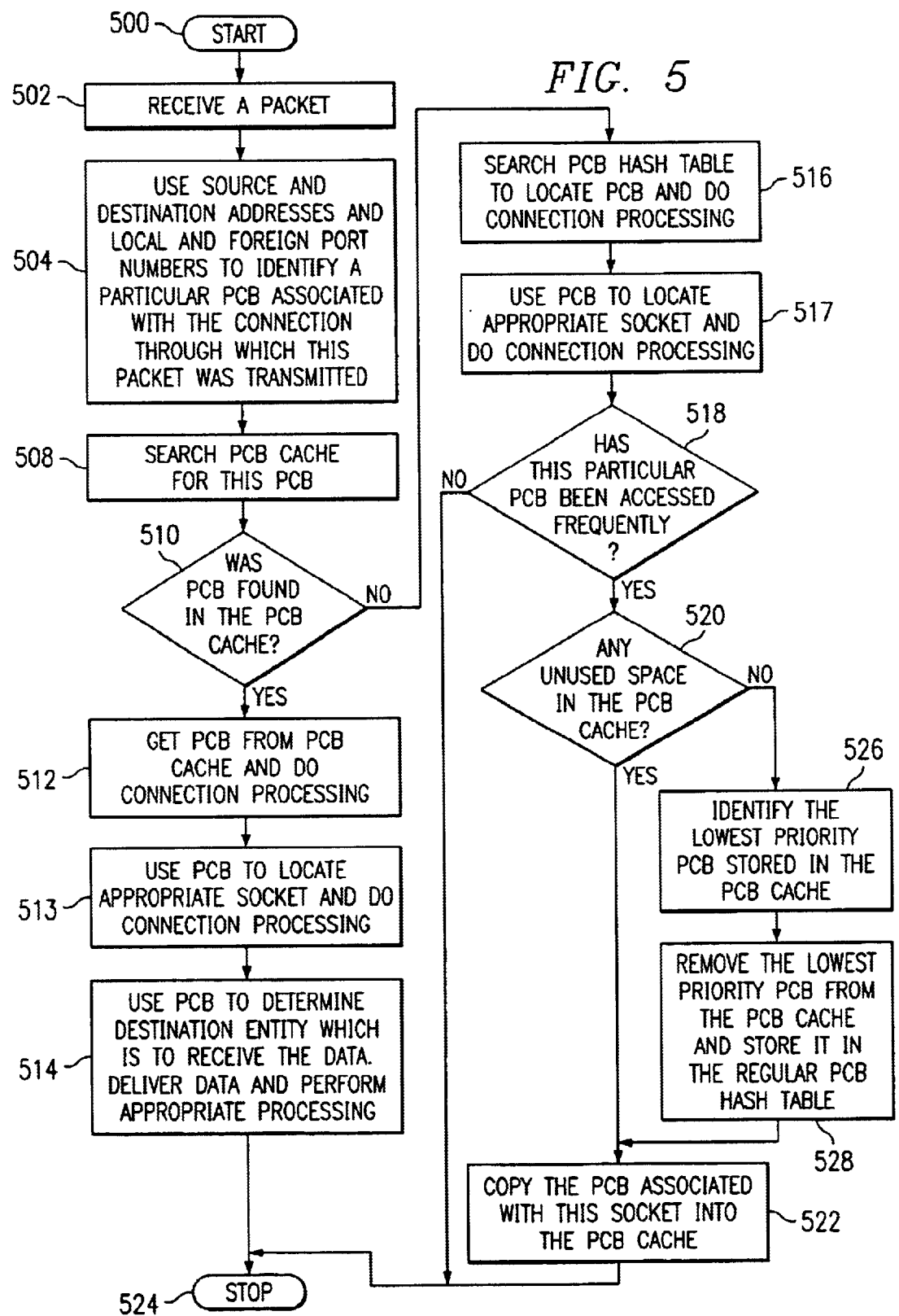
FIG. 5 is a high level flow chart which illustrates a retrieval of protocol control blocks (PCBs) from a PCB cache in accordance with the present invention.
Figure 7:
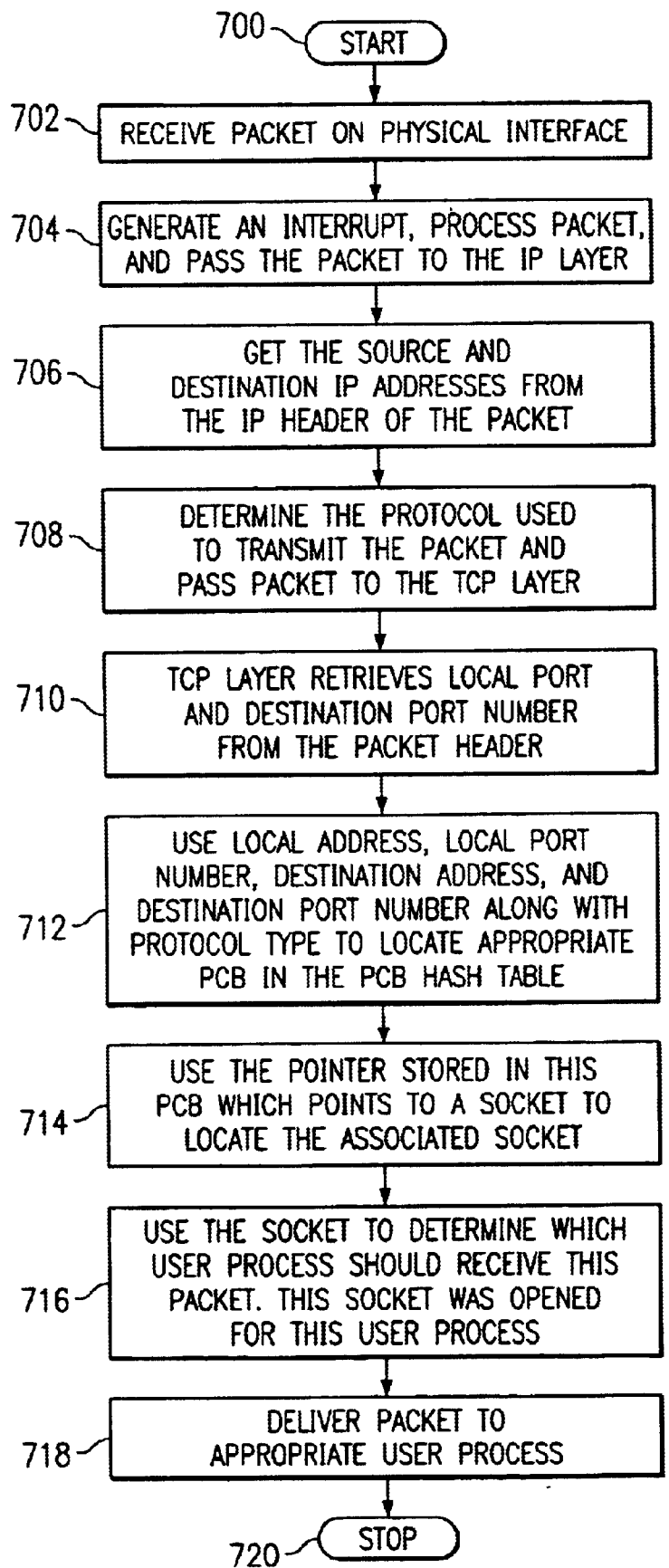
FIG. 7 is a high level flow chart which depicts receiving a packet and forwarding it to its intended user process in accordance with the prior art.

FIG. 5 is a high level flow chart which illustrates a retrieval of protocol control blocks (PCBs) from a PCB cache in accordance with the present invention. The process starts as depicted by block 500 and thereafter passes to block 502 which illustrates a receipt of a packet. Next, block 504 depicts using the source and destination addresses, and the local and destination port numbers obtained from the packet to identify a particular PCB associated with the connection through which this packet was transmitted. Thereafter, block 508 depicts searching the PCB table for this PCB.

Next, block 510 illustrates a determination of whether or not the PCB was found in PCB cache 208A. If a determination is made that the PCB was found in PCB cache 208A, the process passes to block 512 which depicts getting this PCB from PCB cache 208A. Next, block 513 depicts using this PCB to locate the appropriate socket which is associated with this connection. This socket is then used to do connection processing. Block 514, then, illustrates using the PCB to determine the destination entity which is to receive the data. The data is delivered and the appropriate processing is performed. The process then terminates as depicted by block 524.

Referring again to block 510, if a determination is made that the PCB was not found in PCB cache 208A, the process passes to block 516 which illustrates searching the PCB hash table to locate the PCB and executing connection processing. Thereafter, block 517 depicts using this PCB to locate the appropriate socket which is associated with this connection. Next, block 518 depicts a determination of whether or not this particular PCB has been accessed frequently. A software counter could be included for each PCB to maintain a current number of times a particular PCB has been accessed. A particular number of accesses could also be specified. If a particular PCB has been accessed more than the specified number of accesses, the PCB could be considered to be accessed frequently. If a determination is made that this particular PCB has not been accessed frequently, the process terminates as illustrated by block 524.

Referring again to block 518, if a determination is made that a particular PCB has been accessed frequently, the process passes to block 520 which illustrates a determination of whether or not there is any unused space in PCB cache 208A. If a determination is made that there is unused space in PCB cache 208A, the process passes to block 522 which depicts copying the PCB associated with this socket from the hash table into PCB cache 208A. The process then terminates as illustrated by block 524.

Referring again to block 520, if a determination is made that there is no unused space in PCB cache 208A, the process passes to block 526 which illustrates the identification of the lowest priority PCB stored in PCB cache 208A. Next, block 528 depicts the removal of the lowest priority PCB from PCB cache 208A and the storage of this lowest priority PCB into the hash table. The process then passes to block 522.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a computer system for improving network communications, said method comprising the steps of:

prioritizing a protocol control block (PCB) relative to other PCBs, said protocol control blocks being associated with sockets which were created in response to TCP connections;

determining if the PCB is a high priority PCB based on the prioritizing of the PCB relative to other PCBs;

storing the PCB in a PCB cache if it is determined to be a high priority PCB, wherein storing high priority PCBs in the PCB cache includes:

determining if the PCB cache has unused space available in the PCB cache to store the PCB; and if the PCB cache does not have unused space available in the PCB cache, removing a lowest priority PCB from the PCB cache and adding the PCB to the PCB cache.

2. The method according to claim 1, further comprising:

storing the PCB in a data structure separate from the PCB cache if it is determined that the PCB is not a high priority PCB, wherein storing high priority PCBs in the PCB cache further includes:

storing the lowest priority PCB in the data structure separate from the PCB cache.

3. The method according to claim 2, wherein the data structure is a hash table.

4. The method according to claim 3, further comprising the steps of:

receiving a packet;

searching said PCB cache for a PCB which is associated with said packet;

in response to said PCB being located in said PCB cache, retrieving said PCB from said PCB cache; and in response to said PCB not being located in said PCB cache, retrieving said PCB from said hash table.

5. A method in a computer system for improving network communications, said method comprising the steps of:

prioritizing a protocol control blocks (PCBs), said protocol control blocks being associated with sockets which were created in response to TCP connections;

storing high priority PCBs in a fast access memory device;

including an option in each of said sockets for storing an indication of a priority of a connection associated with each of said sockets; and in response to one of said sockets including an option including an indication of a high priority, storing a PCB associated with said one of said sockets in said PCB cache.

6. A method in a computer system for improving network communications, said method comprising the steps of:

prioritizing a protocol control blocks (PCBs), said protocol control blocks being associated with sockets which were created in response to TCP connections;

storing high priority PCBs in a fast access memory device;

determining whether each of said plurality of PCBs has been retrieved frequently; and if a determination is made that said each of said plurality of PCBs has been retrieved frequently, prioritizing said each of said plurality of PCB as a high priority and storing said each of said plurality of PCBs in said PCB cache.

7. The method according to claim 6, further comprising the steps of:

including an option in each of said sockets for storing an indication of a priority of a connection associated with each of said sockets; and if a determination is made that said each of said plurality of PCBs has not been retrieved frequently, prioritizing said each of said plurality of PCB as a low priority and storing said each of said plurality of PCBs in said hash table.

8. A computer program product in a computer system for improving network communications, said computer program product comprising:

instruction means for prioritizing protocol control block (PCB) relative to other PCBs, said protocol control blocks being associated with sockets which were created in response to TCP connections;

instruction means for determining if the PCB is a high priority PCB based on the prioritizing of the PCB relative to other PCBs;

instruction means for storing the PCB in a PCB cache if it is determined to be a high priority PCB, wherein the instruction means for storing high priority PCBs in the PCB cache includes:

instruction means for determining if the PCB cache has unused space available in the PCB cache to store the PCB; and instruction means for removing a lowest priority PCB from the PCB cache and adding the PCB to the PCB cache if the PCB cache does not have unused space available in the PCB cache.

9. The product according to claim 8, further comprising:

instruction means for storing the PCB in a data structure separate from the PCB cache if it is determined that the PCB is not a high priority PCB, wherein storing high priority PCBs in the PCB cache further includes:

instructions means for storing the lowest priority PCB in the data structure separate from the PCB cache.

10. The product according to claim 9, wherein the data structure is a hash table.

11. The product according to claim 10, further comprising:

instruction means for receiving a packet;

instruction means for searching said PCB cache for a PCB which is associated with said packet;

in response to said PCB being located in said PCB cache, instruction means for retrieving said PCB from said PCB cache; and in response to said PCB not being located in said PCB cache, instruction means for retrieving said PCB from said hash table.

12. A computer program product in a computer system for improving network communications, said computer program product comprising:

instruction means for prioritizing protocol control blocks (PCBs), said protocol control blocks being associated with sockets which were created in response to TCP connections;

instruction means for storing high priority PCBs in a fast access memory device;

instruction means for including an option in each of said sockets for storing an indication of a priority of a connection associated with each of said sockets; and in response to one of said sockets including an option including an indication of a high priority, instruction means for storing a PCB associated with said one of said sockets in said PCB cache.

13. A computer program product in a computer system for improving network communications, said computer program product comprising:

instruction means for prioritizing protocol control blocks (PCBs), said protocol control blocks being associated with sockets which were created in response to TCP connections;

instruction means for storing high priority PCBs in a fast access memory device;

instruction means for determining whether each of said plurality of PCBs has been retrieved frequently; and if a determination is made that said each of said plurality of PCBs has been retrieved frequently, instruction means for prioritizing said each of said plurality of PCB as a high priority and storing said each of said plurality of PCBs in said PCB cache.

14. The product according to claim 13, further comprising:

instruction means for including an option in each of said sockets for storing an indication of a priority of a connection associated with each of said sockets; and if a determination is made that said each of said plurality of PCBs has not been retrieved frequently, instruction means for prioritizing said each of said plurality of PCB as a low priority and storing said each of said plurality of PCBs in said hash table.

15. A computer system for improving network communications, comprising:

means for prioritizing protocol control block (PCB) relative to other PCBs, said protocol control blocks being associated with sockets which were created in response to TCP connections;

means for determining if the PCB is a high priority PCB based on the prioritizing of the PCB relative to other PCBs;

a PCB cache memory device for storing the PCB if it is determined to be a high priority PCB, wherein the instruction means for storing high priority PCBs in the PCB cache includes:

means for determining if the PCB cache has unused space available in the PCB cache to store the PCB; and means for removing a lowest priority PCB from the PCB cache and adding the PCB to the PCB cache if the PCB cache does not have unused space available in the PCB cache.

16. The system according to claim 15, further comprising:

means for storing the PCB in a data structure separate from the PCB cache if it is determined that the PCB is not a high priority PCB, wherein storing high priority PCBs in the PCB cache further includes:

means for storing the lowest priority PCB in the data structure separate from the PCB cache.

17. The system according to claim 16, wherein the data structure is a hash table.

18. The system according to claim 17, further comprising:

said system for receiving a packet;

said PCB cache for being searched for a PCB which is associated with said packet;

in response to said PCB being located in said PCB cache, said system for retrieving said PCB from said PCB cache; and in response to said PCB not being located in said PCB cache, said system for retrieving said PCB from said hash table.

19. A computer system for improving network communications, comprising:

means for prioritizing protocol control blocks (PCBs), said protocol control blocks being associated with sockets which were created in response to TCP connections;

a fast access memory device for storing high priority PCBs;

an option included in each of said sockets for storing an indication of a priority of a connection associated with each of said sockets; and in response to one of said sockets including an option including an indication of a high priority, a PCB associated with said one of said sockets being stored in said PCB cache.

20. A computer system for improving network communications, comprising:

means for prioritizing protocol control blocks (PCBs), said protocol control blocks being associated with sockets which were created in response to TCP connections;

a fast access memory device for storing high priority PCBs;

means for determining whether each of said plurality of PCBs has been retrieved frequently;

if a determination is made that said each of said plurality of PCBs has been retrieved frequently, said each of said plurality of PCB being prioritized as a high priority and storing said each of said plurality of PCBs in said PCB cache.

21. The system according to claim 20, further comprising:

an option included in each of said sockets for storing an indication of a priority of a connection associated with each of said sockets; and if a determination is made that said each of said plurality of PCBs has not been retrieved frequently, said each of said plurality of PCB being prioritized as a low priority and storing said each of said plurality of PCBs in said hash table.

* * * * *